United States Patent [19]
Edighoffer

[11] Patent Number: 5,029,172
[45] Date of Patent: Jul. 2, 1991

[54] HIGHLY EFFICIENT FREE-ELECTRON LASER SYSTEM

[75] Inventor: John A. Edighoffer, Pleasenton, Calif.

[73] Assignee: TRW Inc., Redondo Beach, Calif.

[21] Appl. No.: 333,669

[22] Filed: Apr. 6, 1989

[51] Int. Cl.[5] .............................................. H01S 3/00
[52] U.S. Cl. ....................................... 372/2; 372/74
[58] Field of Search ............................ 372/2; 315/4, 5

[56] References Cited

U.S. PATENT DOCUMENTS

| | | | |
|---|---|---|---|
| 4,538,275 | 8/1985 | Szu | 372/2 |
| 4,570,103 | 2/1986 | Schoen | 372/2 |
| 4,755,764 | 7/1988 | Rosenberg et al. | 372/2 |

Primary Examiner—Léon Scott, Jr.
Attorney, Agent, or Firm—Noel F. Heal; Sol L. Goldstein

[57] ABSTRACT

Apparatus, and a related method for its operation, for producing a high-power optical beam from a free-electron laser, at a high overall efficiency. Electrons are accelerated in an electron acceleration system producing bunches of electrons having a narrow energy spread but relatively long time spread. A bunch compression technique converts each bunch to one having a narrow time spread and relatively wide energy spread, suitable for injection into the gain region of a free-electron laser. After exit from the gain region, each electron bunch is further processed to restore it to the same energy-phase distribution as electrons produced by the acceleration system. The restored bunches of electrons are decelerated in the acceleration system, to conserve energy and increase the overall efficiency of the system.

11 Claims, 2 Drawing Sheets

HIGHLY EFFICIENT FREE-ELECTRON LASER SYSTEM

This invention was made with Government support under N00014-84-C-0667 awarded by the Department of the Navy. The Government has certain rights in this invention.

BACKGROUND OF THE INVENTION

This invention relates generally to free-electron lasers and, more particularly, to techniques for increasing the efficiency of free-electron lasers. By way of background, a free-electron laser generates coherent light when bunches of free electrons, accelerated to near relativistic velocities, i.e. near light speed, are passed through an alternating magnetic field known as a wiggler. Considerable energy is required to accelerate the electrons to near light speed, and the overall efficiency of such a system, referred to as the wallplug efficiency, is typically only a few percent.

Basically, a free-electron laser has two principal components: the laser itself, in which some of the energy of the electrons is converted into light energy, and an electron acceleration-recirculation system. Unfortunately, these two components have conflicting requirements that give rise to inefficiencies in the overall system. The acceleration-recirculation system ideally requires that each bunch of accelerated electrons be spread over a relatively long time interval but over a relatively small energy range. This makes for efficiency of energy recovery from electrons emerging from the laser, and avoids electron beam instabilities. On the other hand, the free-electron laser ideally needs a large peak current to extract energy efficiently from the electron beam. A large peak current can only be achieved if the electrons are bunched together in time, rather than spread out as is desirable for the acceleration-recirculation system.

Another incompatibility arises because the free-electron laser not only reduces the average energy of the electron beam, but also spreads each bunch of electrons across a wider energy range. This renders each bunch of electrons less suitable for reintroduction to the acceleration-recirculation system. Typically a free-electron laser introduces an energy spread equal to about twice its extraction efficiency, and the wider spread is difficult to accommodate in the acceleration-recirculation system.

It will be appreciated from the foregoing that there is a need in the field of free-electron lasers for an overall system with a greatly improved wallplug efficiency. The present invention achieves this goal by meeting the separate efficiency requirements of the free-electron laser and the acceleration-recirculation system.

SUMMARY OF THE INVENTION

The present invention resides in a highly efficient free-electron laser system in which the wallplug efficiency is increased by providing both the laser system and the associated acceleration-recirculation system with bunches of electrons with an energy-phase relationship that meets the requirements of the respective systems. The laser system is operated in an efficient manner because it is supplied with bunches of electrons having a narrow time spread and high peak current. The acceleration-reirculation system is operated efficiently because it generates and recirculates bunches of electrons that have a narrow energy spread and wide time spread.

Briefly, and in general terms, the apparatus of the invention includes electron accelerating means, for accelerating bunches of electrons to relativistic speeds in such a manner that each bunch of electrons has a relatively small energy spread and a relatively long time spread, an electron bunch compressor, for converting each bunch of electrons to have a relatively wide energy spread and a relatively small time spread, and a free-electron laser gain region, including a wiggler into which the compressed electron bunches are introduced. There is emission of light in the gain region and coherent light is generated in the laser. The output electron bunches have a reduced average energy level but an increased energy spread. On the output side of the laser, the apparatus of the invention further includes an electron bunch expander, for restoring each bunch of electrons leaving the laser gain region to the same time spread as the bunches emerging from the electron accelerator means, and for reducing the energy spread of the bunches, means for accelerating the bunches to replace the energy converted to light in the free-electron laser, and means for introducing the bunches of electrons into the electron acceleration means, to provide accelerating energy to new bunches being accelerated.

In the preferred embodiment of the invention, the electron accelerating means includes a plurality of electron cells, some of which operate at a fundamental frequency and some of which operate at a third-harmonic frequency, to produce a relatively flat accelerating field with reduced cosine dependence, thereby reducing the energy spread of each bunch of electrons. In the illustrative embodiment of the invention, electron acceleration is achieved by radio-frequency (rf) acceleration cavities. In the bunch compressor, each bunch of electrons is first passed through a bunching rf cavity, which operates on a practically linear portion of an alternating acceleration signal, such that later-arriving electrons in a bunch are accelerated or decelerated more than earlier-arriving electrons. The bunch is thereby spread further apart in terms of energy, and attains an electron energy that is dependent on time of arrival or longitudinal position in the bunch. Each bunch is then processed through a component that provides different path lengths for different electron energies. Higher or lower energy electrons, which are positioned toward the trailing end of the bunch, take a shorter path and arrive earlier than they would otherwise. At the output of this component, each electron bunch is compressed in time by the same factor that its energy spread was increased in the bunching cavity, and the bunch is now of an appropriate nature for introduction to the laser gain region. This conserves longitudinal phase space.

In the bunch expander of the preferred embodiment, a first component spreads the bunch in time, correlating energy with position; then a second component provides a cavity acceleration that is proportional to electron arrival time, accelerating the later-arriving electrons more than the earlier-arriving ones, to remove much of the energy position correlation. This is nearly the inverse of the process occurring in the bunch compressor, but is not exactly equivalent because the energy spread on the output side of the laser gain region is greater than on the input side. Accordingly, the path length differences need not be so great on the output or expander side, to produce the same bunch length as on the input side.

Optionally, the accelerator system may employ recirculation to minimize the number of accelerating modules. With recirculation, electrons are first accelerated by one pass through the accelerating modules, then recirculated one or more additional times to further increase the electron velocities. Similarly, bunches of electrons recovered from the laser gain region are decelerated by multiple passes through the accelerating modules, in which energy of the decelerating electron bunches is transferred to the accelerating electron bunches.

In terms of a novel method, the invention includes the steps of accelerating bunches of electrons to relativistic velocities in a series of accelerating modules providing bunches with relatively small energy spread, converting each bunch of electrons to one with relatively large energy spread and short time spread, passing the converted bunches through the gain region of a free-electron laser, and, in the laser, converting some of the electron bunch energy to light and increasing the energy spread. On the output side of the laser, the method steps include converting each bunch of electrons emerging from the laser to one with relatively small energy spread and wider time spread, accelerating the bunches of electrons to restore energy converted to light in the laser, and decelerating the bunches of electrons in the same series of accelerating modules used to accelerate the electrons, to reduce the energy requirements for acceleration.

As a result of the invention, both the laser and the associated acceleration-recirculation system are operated at a high level of efficiency. Consequently, the wallplug efficiency of the entire system can be as high as 25–30 percent, or even higher, which is a dramatic improvement over the usually expected efficiencies of only a few percent. It will be appreciated from the foregoing that the present invention represents a significant improvement over free-electron laser systems of the prior art. In particular, the invention provides a highly efficient system with applications in many different areas, such as chemical and pharmaceutical reactions, medicine, welding, cutting and annealing, and power transmission over long distances or to space. Other aspects and advantages of the invention will become apparent from the following more detailed description, taken in conjunction with the accompanying drawings.

BRIEF DESCRIPTION OF THE DRAWINGS

FIGS. 3a–3h are electron beam phase space diagrams showing the time-energy relationship for bunches of electrons at various stages of processing in the system of FIG. 1.

DESCRIPTION OF THE PREFERRED EMBODIMENT

Figure 1:
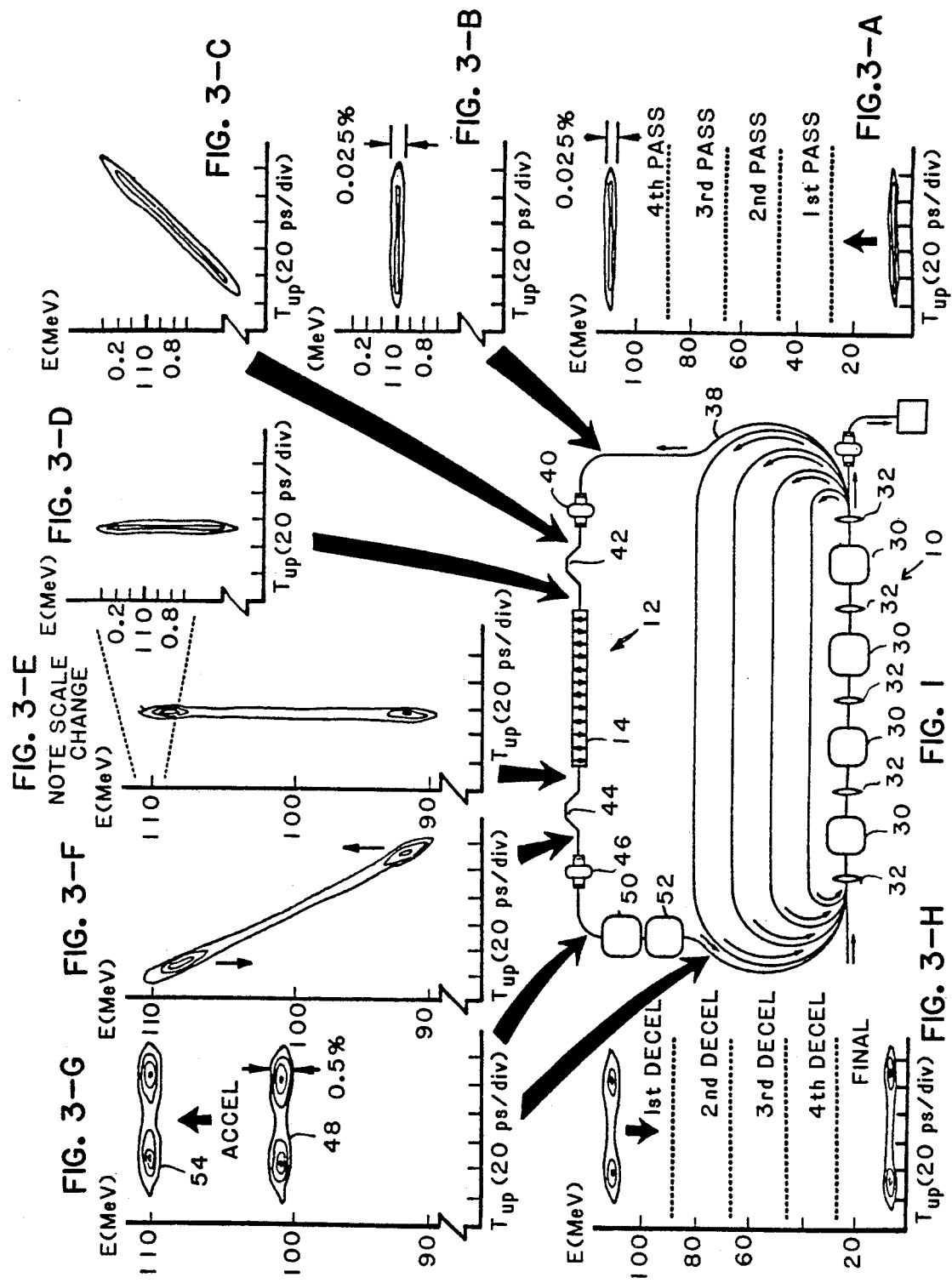
FIG. 1 is a schematic diagram of a free-electron laser system in accordance with the present invention.

As shown in the drawings for purposes of illustration, the present invention is principally concerned with a novel technique for operation of a free-electron laser. A free-electron laser, as shown in FIG. 1, includes an electron acceleration system, referred to generally by reference numeral 10, and the laser system itself 12. The electron acceleration system 10 provides a beam of electrons, or more precisely a beam containing periodic bunches of electrons, moving at speeds approaching the speed of light. The electron beam is directed into a gain region 14 in which there is an alternating field, usually a magnetic field, the direction of which is perpendicular to the electron beam, and alternates as one progresses through the field in the direction of the beam. The gain region 14 may be part of an optical oscillator or an amplifier.

Interaction between the magnetic field, referred to as a wiggler, and the relativistic electron beam stimulates photon emission, which, with an appropriate optical system, results in the emission of a coherent light beam 16 of extremely high power. Shown by way of example of an optical system is a ring resonator having multiple mirrors 18, 20, 22 and 24, and an out-coupling mirror 26 for removing some significant fraction of the circulating power of the optical beam 16.

The electron accelerating system 10 is shown as including a series arrangement of four accelerator modules 30 and five beam focusing lenses 32, one positioned before each module and one positioned following the last module in the series. Electrons are introduced into the first of the modules 30, as indicated at 34, and progressively accelerated by synchronized rf signals applied to the modules.

Figure 2:
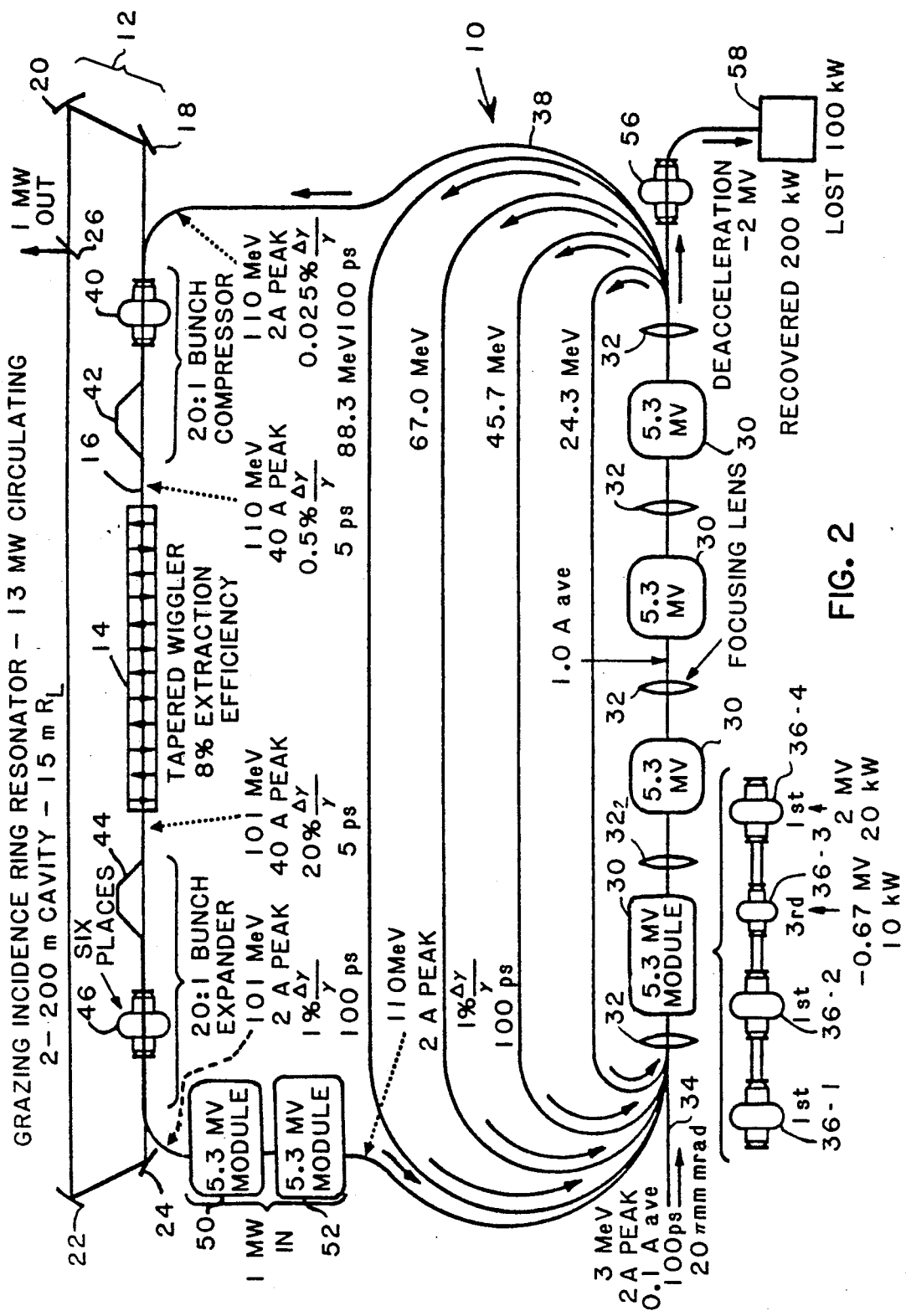
FIG. 2 is a schematic diagram showing the arrangement of accelerating cavities in each of several accelerating modules of FIG. 1.

As shown in FIG. 2, each of the accelerator modules 30 includes four rf accelerator cavities 36.1, 36.2, 36.3 and 36.4 arranged in series along the beam path. The first two 36.1 and 36.2 and the last 36.4 of these cavities operates at a fundamental frequency, and the third cavity 36.3 operates at the third harmonic frequency and at appropriately reduced power. The bunches of electrons accelerated by these cavities are normally timed to arrive in each cavity near the peak of the rf accelerating field. The purpose of the the third harmonic accelerator cavity is, when averaged with the other cavities, to flatten out the peak of the fundamental accelerating field and produce an accelerating force that extends over a longer time interval at a relatively uniform level, and to reduce time dependent focusing effects. Ideally, a square periodic waveform for the accelerating field is most desirable, since this would produce a uniform accelerating force for a relatively long period. It is well known from Fourier analysis that the principal components of a square periodic wave are the fundamental and the third harmonic frequencies. Therefore, the combination of three fundamental accelerator cavities and one third-harmonic accelerator cavity gives an approximation of a square waveform. Other harmonics can also be used.

In the illustrative acceleration system 10, the accelerated bunches of electrons are recirculated four additional times through the accelerator modules 30, as indicated by the multiple return paths in the figure. Implied at the point of diversion of these alternate paths is a conventional component for separating the bunches of electrons based on their respective momenta. This function may be performed by a magnetic or electric field, which could also be incorporated into the final focusing lens 32 of the system. After five passes through the accelerating modules 30, bunches of electrons take the path indicated by reference numeral 38, and leave the electron accelerating system 10.

The energy states of electrons in the bunches being accelerated can best be depicted in the form of phase space diagrams, such as those shown in FIGS. 3a–3h. Each phase space diagram plots the relationship between the relative arrival time or phase of electrons in the bunch and the energy level. The arrival time, which represents electron position or phase in the bunch, is plotted along the horizontal axis at a scale of 20 picoseconds per division. The electron energy in MeV (million electron-volts) is plotted along the vertical axis.

As shown in FIG. 3a, the phase-space depiction of the electron bunches emerging from the acceleration system is elongated in the direction of the time axis and very narrowly bunched in the direction of the energy axis, with an energy spread of only about 0.025% of the average energy level of 110 MeV. This small energy spread is, in part, a result of the use of a third-harmonic component in the accelerating modules. During each pass through the acceleration system the average energy of the electrons is progressively increased, as indicated in FIG. 3a. The shape and density of the phase space figure representing a bunch of electrons remains practically constant at each pass. FIG. 3b shows the phase space diagram of a bunch of electrons after leaving the acceleration system 10.

It is well known to those in the field of particle beams that one cannot change the density in phase space of a bunch of packet of particles. This results from Liouville's Theorem and, in the present context, means that the area of the phase-space area of each bunch of electrons will remain constant or grow during various conversions and manipulations.

The phase-space distribution of an electron bunch upon leaving the acceleration system 10 is not consistent with the requirements of the laser system 12. Ideally, the laser requires that the electrons in a bunch be closely spaced in time, to provide a high peak current. This ideal is reached by a two-stage bunch compression process achieved by components 40 and 42. Component 40 is an rf cavity similar to the cavities 36 in the acceleration system, but with a crucial timing difference. The rf signal applied to the bunching cavity 40 is timed to be in a practically linear portion of its alternating waveform when the bunch of electrons arrives in the cavity. The accelerating effect of the cavity is, therefore, practically linearly related to the electron phase or arrival time. Harmonics can be added to this field to improve the bunching. Thus, late-arriving electrons are accelerated more than earlier ones, and the phase space diagram is rotated to the position shown in FIG. 3c. In fact this is both a rotation and a stretching of the phase space figure, so that the time spread remains approximately unchanged but the figure is stretched out, as shown, in the direction of the energy axis. The bunch at this stage has a correlation between electron energy and longitudinal position or phase within the bunch.

Next, each electron bunch is processed through component 42, which provides different path lengths for different electron velocities or momenta. The higher-energy electrons take a shorter path length through component 42 and, therefore, exit the component earlier than they otherwise would. Thus the phase space figure is shortened in the time direction but retains its energy spread. With appropriate selection of the parameters of components 40 and 42, the phase space figure can be effectively rotated to the position shown in FIG. 3d, with a narrow time range and a relatively broad energy range. This is also consistent with Liouville's Theorem, and places each electron bunch in the ideal condition for interaction in the gain region 14 of the laser.

The component 42 can take the form of a series of bending magnetic fields through which the beam is passed. At each bending field, the higher-energy electrons are bent through a smaller angle than the lower-energy electrons. An appropriate number of direction changes at these bends can place all of the electrons back on the same path again, but the higher energy electrons will have traversed a shorter path. For example, two left-hand bends and two equivalent right-hand bends can be configured to divert the beam to a displaced path and then back to a path colinear with the original one. However, the higher-energy are displaced by a shorter distance from the original path and traverse a shorter path length than the lower-energy electrons. Alternative magnetic dispersion systems can be made with the opposite dispersion, so that the higher energy electrons take the longer path. In this case the bunching cavity 40 would have the reverse phase, rotating the phase space in the opposite direction.

The laser gain region 14 has two effects on the phase space figure representing the electron bunch. First, the average electron energy of the bunch is reduced by the amount of energy removed in the gain region and used to generate light. Second, the phase space figure is further stretched in the energy-axis direction, by a factor equal to approximately twice the efficiency of the laser. The phase space diagram for an electron bunch leaving the laser gain region 14 is shown in FIG. 3e, which has a reduced energy scale compared to FIGS. 3a-3d.

For efficiency of operation, the electron bunches leaving the laser gain region 14 should ideally be used to accelerate additional electrons for use in the laser. However, the phase space condition of the bunches of electrons leaving the laser must be further processed to place them in a condition more consistent with the requirements of the electron acceleration system 10. First, the electrons are passed through a path-length-difference component 44 similar in principle to component 42. Higher-energy electrons in each bunch will take a shorter path length or, for alternate designs, a longer path, and will leave the component before lower-energy electrons. Thus the phase space figure will be skewed to the position shown in FIG. 3f, and spread out in the direction of the time axis.

Each electron bunch will then be processed in another rf cavity 46 similar to the cavity 40. Acceleration applied to the electrons in cavity 46 is linearly dependent on the longitudinal electron position, and the phase space figure will therefore be further skewed to the position shown at 48 in FIG. 3g. Components 44 and 46 are not identical to components 42 and 40, since the energy spread of the electron bunches emerging from the gain region 14 is less than the energy spread of bunches entering the gain region. Therefore, a smaller path length difference will be needed in component 44 than in component 42 to achieve the same degree of phase space figure rotation. For similar reasons, the cavity component 46 will require either more cavities or a stronger field than that of the cavity 40, since the energy spread is greater at the exit side of the laser gain region 14.

Before the electrons can be efficiently decelerated in the acceleration-recirculation system 10, they must first be accelerated to the same energy level they had upon leaving the acceleration system. This is to replace the energy transferred from the electron beam to the optical beam within the gain region. Additional accelerator modules 50 and 52 are employed for this purpose. After acceleration in these modules, the phase space figure appears as shown at 54 in FIG. 3g.

The "spent" electron bunches emerging from module 52 are then reintroduced back into the acceleration-recirculation system 10, but with a timing relationship 180 degrees out of phase with the electron bunches being accelerated in the system. The spent bunches of electrons are progressively decelerated by the modules 30, and five successive passes are made through the acceleration-recirculation system. These deceleration phases are shown in the phase space diagrams of FIG. 3h. The resulting low-energy electron bunches finally emerging from the acceleration-recirculation system 10 are directed to a further deceleration cavity 56, which recovers some of the remaining electron energy in rf form. This also reduces the beam energy below that required for neutron production, making shielding much easier. The electrons are then "dumped" into an appropriate receptacle 58, such as a container of water or other material.

While all the components are shown as separate for illustration and discussion of each function, in practice components could be combined and more than one function performed simultaneously.

It will be observed that the system of the invention not only optimizes the energy profile of electron bunches to satisfy the requirements of the two major components of the system, but also employs the minimum necessary energy to accelerate the electrons. The energy needed to produce light in the laser is added to the system through the modules 50 and 52. Energy is also added in the form of the initially injected electrons. However, the acceleration-recirculation system operates theoretically without any additional energy, since the energy needed to accelerate electrons is derived from spent bunches of electrons being decelerated in the same apparatus. Energy is also recovered from the spent electrons in the final cavity 56. Naturally, there are inevitable losses, but such a system can achieve a wallplug efficiency in the region of 25–30 percent, which is far in excess of the very low efficiencies previously obtained in free-electron laser systems. With improved rf sources or at lower frequencies, efficiencies of up to 60–65 percent are possible. By way of example, various energy levels, accelerator cavity parameters, and other system parameters are provided in FIG. 1, which illustrates a system in which approximately 13 MW (megawatts) of power is circulating in the ring resonator beam, and approximately 1 MW is outcoupled and the fundamental frequency is 500 megahertz (MHz).

Although the invention has been described as including recirculation paths for electrons undergoing acceleration and deceleration, it will be understood that sufficiently high electron velocities may be obtained in a single pass of a series of suitably designed accelerator modules. Moreover, certain aspects of the invention are equally applicable to systems employing other coupling mechanisms between electron beams and optical beams. The free-electron laser provides a relatively efficient coupling mechanism and is obviously an important illustration of the principles of the invention.

It will be appreciated from the foregoing that the present invention represents a significant improvement in the field of free-electron lasers. In particular, the invention provides a highly efficient system for the conversion of the energy of an electron beam to coherent light energy. Efficiency is achieved by matching the energy-phase relationship of electrons in each bunch to the requirements of the principal components of the system, and employing energy of spent bunches of electrons to accelerate other bunches for use in the laser. It will also be appreciated that, although an embodiment of the invention has been described in detail for purposes of illustration, various modifications may be made without departing from the spirit and scope of the invention. Accordingly, the invention is not to be limited except as by the appended claims.

I claim:

1. A highly efficient free-electron laser system, comprising:
   electron accelerating means, for accelerating bunches of electrons to relativistic speeds in such a manner that each bunch of electrons has a relatively small energy spread, and a relatively long time spread;
   an electron bunch compressor, for converting each bunch of electrons to have a relatively wide energy spread and a relatively small time spread;
   a free-electron laser gain region, including a wiggler into which the compressed electron bunches are introduced, to generate spontaneous emission of photons and produce output electron bunches with a reduced average energy level but an increased total energy spread;
   an electron bunch expander, for restoring each bunch of electrons from the laser gain region to the same time spread as the bunches emerging from the electron accelerator means, and for reducing the energy spread of the bunches;
   means for accelerating the bunches to replace the energy converted to light in the free-electron laser; and
   means for introducing the bunches of electrons into the electron acceleration means, to provide accelerating energy to new bunches being accelerated.

2. A free-electron laser system as defined in claim 1, wherein the bunch compressor includes:
   means for expanding the energy spread of each bunch of electrons by providing an acceleration dependent on electron longitudinal position within the bunch; and
   means for compressing the arrival time of electrons within each bunch, by diverting lower-energy electrons through longer or shorter path lengths than higher-energy electrons.

3. Free-electron laser system as defined in claim 2, wherein the electron bunch expander includes:
   means for expanding the arrival time of electrons within each bunch, by diverting lower-energy electrons through longer or shorter path lengths than higher-energy electrons; and
   means for contracting the energy spread of each bunch of electron providing an acceleration dependent on electron longitudinal position within the bunch.

4. A free-electron laser system as defined in claim 1, wherein the electron accelerating means includes:
   a plurality of accelerator cavities operating at a fundamental frequency; and
   at least one additional accelerator cavity operating at a harmonic frequency, to provide an approximation of a square waveform or flat acceleration field.

5. A free-electron laser as defined in claim 1, wherein:
   there is three times the acceleration at the fundamental frequency as there is at the third harmonic frequency.

6. A free-electron laser as defined in claim 1, wherein the electron accelerating system includes:
   means for recirculating bunches of electrons through multiple passes of the the accelerating system, to obtain higher velocities with fewer accelerating modules.

7. A highly efficient free-electron laser system, comprising:
   an electron acceleration-recirculation system for accelerating bunches of electrons to relativistic speeds in such a manner that each bunch of electrons has a relatively small energy spread, and a relatively long time spread, the acceleration-recirculation system including multiple accelerator modules and means for recirculating bunches of electrons through multiple passes of the modules;
   an electron bunch compressor, for converting each bunch of electrons to have a relatively wide energy spread and a relatively small time spread, the bunch compressor including means for expanding the energy spread of each bunch of electrons by providing an acceleration dependent on electron longitudinal position within the bunch, and means for compressing the arrival time of electrons within each bunch, by diverting lower-energy electrons through longer or shorter path lengths than higher-energy electrons;
   a free-electron laser gain region, including a wiggler into which the compressed electron bunches are introduced, to generate stimulated emission of photons and produce output electron bunches with a reduced average energy level but an increased total energy spread;
   an electron bunch expander, for restoring each bunch of electrons from the laser gain region to the same time spread as the bunches emerging from the electron accelerator means, and for reducing the energy spread of the bunches, the electron bunch expander including means for expanding the arrival time of electrons within each bunch, by diverting lower-energy electrons through longer path lengths than higher-energy electrons, and means for contracting the energy spread of each bunch of electrons by providing an acceleration dependent on electron longitudinal position within the bunch;
   means for accelerating the bunches to replace the energy converted to light in the free-electron laser;
   means for introducing spent bunches of electrons into the electron acceleration means, to provide accelerating energy to new bunches being accelerated, whereby each spent bunch of electrons also makes multiple passes through the accelerator modules; and
   additional deceleration means for extracting some of the residual energy from the spent electron bunches after deceleration in the accelerator modules.

8. A method of operating a highly efficient free-electron laser system, comprising the steps of:
   accelerating bunches of electrons to relativistic velocities in a series of accelerating modules providing bunches with relatively small energy spread;
   converting each bunch of electrons to one with relatively large energy spread and short time spread;
   passing the converted bunches through the gain region of a free-electron laser;
   converting some of the electron bunch energy to light and increasing the energy spread in the laser;
   converting each bunch of electrons emerging from the laser to one with relatively small energy spread and wider time spread;
   accelerating the bunches of electrons to restore energy converted to light in the laser; and
   decelerating the bunches of electrons in the same series of accelerating modules used to accelerated the electrons, to reduce the energy requirements for acceleration.

9. A method as defined in claim 8, wherein the step of converting each bunch of electrons to one of large energy spread includes the steps of:
   expanding the energy spread of each bunch of electrons by providing an acceleration dependent on electron longitudinal position within the bunch; and
   compressing the arrival time of electrons within each bunch, by diverting lower-energy electrons through longer or shorter path lengths than higher-energy electrons.

10. A method as defined in claim 8, wherein the step of converting each bunch of electrons emerging from the laser to one with relatively small energy spread and wider time spread includes the steps of:
   expanding the arrival time of electrons within each bunch, by diverting lower-energy electrons through longer or shorter path lengths than higher-energy electrons; and
   contracting the energy spread of each bunch of electrons by providing an acceleration dependent on electron longitudinal position within the bunch.

11. A method as defined in claim 8, wherein the accelerating and decelerating steps include:
   accelerating the electrons with an alternating signal at a fundamental frequency; and
   accelerating the electrons with an alternating signal at a third harmonic frequency, to provide a composite acceleration force that is more nearly uniform in magnitude over an interval of time.

* * * * *